(12) United States Patent
Pike et al.

(10) Patent No.: US 7,095,735 B2
(45) Date of Patent: Aug. 22, 2006

(54) SYSTEM AND METHOD FOR A CONTROL SERVICES LINK FOR A MULTI-SHELF NODE IN A COMMUNICATION SWITCH

(75) Inventors: Dion Pike, Dunrobin (CA); Joseph Soetemans, Nepean (CA)

(73) Assignee: Alcatel Canada Inc., Kanata (CA)

( * ) Notice: Subject to any disclaimer, the term of this patent is extended or adjusted under 35 U.S.C. 154(b) by 849 days.

(21) Appl. No.: 10/012,434

(22) Filed: Dec. 12, 2001

(65) Prior Publication Data

US 2003/0058846 A1    Mar. 27, 2003

(30) Foreign Application Priority Data

Sep. 27, 2001   (CA) ................................. 2358037

(51) Int. Cl.
*H04L 12/66* (2006.01)
(52) U.S. Cl. ...................... 370/360; 370/503
(58) Field of Classification Search ............... 370/522, 370/524, 525, 407, 207, 410, 400, 458, 408, 370/424, 431, 384, 395.2, 360, 503
See application file for complete search history.

(56) References Cited

U.S. PATENT DOCUMENTS

| | | |
|---|---|---|
| 3,997,879 A | 12/1976 | Markley et al. |
| 5,729,546 A | 3/1998 | Gupta et al. |
| 6,421,322 B1 * | 7/2002 | Koziy et al. ................ 370/248 |

FOREIGN PATENT DOCUMENTS

EP    0 687 123    12/1995

* cited by examiner

*Primary Examiner*—Chi Pham
*Assistant Examiner*—Alexander O. Boakye
(74) *Attorney, Agent, or Firm*—McCarthy Tétrault LLP

(57) ABSTRACT

A connection system for a communication switch is provided. The switch comprises a controller and shelves providing communication capabilities for the switch. The controller is able to communicate with each shelf shelves utilizing categories of communication signals. The connection system comprises connections providing signalling links for the categories of communication signals between the controller and the each shelf. The connections are bundled together in a single, collective span of cable and each connection provides its individual category communication signals independently of the other connections.

19 Claims, 7 Drawing Sheets

SYSTEM AND METHOD FOR A CONTROL SERVICES LINK FOR A MULTI-SHELF NODE IN A COMMUNICATION SWITCH

FIELD OF THE INVENTION

The invention relates to a system and method providing transmission of control information via control services communication links between components in a communication device.

BACKGROUND OF INVENTION

Many communication switch and router systems architecture provide modular communication capabilities. Lucent Technologies, Murray Hill, N.J. has announced a system under its MSC 25000 Multiservice Packet Core Switch (trade-mark of Lucent Technologies). Marconi plc, London, England has announced a system under its BXR 48000 router (trade-mark of Marconi plc). A common feature of a modular system is to provide separate shelves dedicated to specific tasks.

In order to have the shelves operate together in the switch, it is necessary to have the shelves communicating control information with and amongst themselves. Prior art systems provide the communication links, but there is added complexity in the communication link when the control signals increase in number and complexity. Prior art systems do not manage these signals in an elegant and physically simple manner.

There is a need for a system and method which improves upon the control signalling systems of the prior art.

SUMMARY OF INVENTION

In a first aspect, a connection system for a communication switch is provided. The switch comprises a controller and shelves providing communication capabilities for the switch. The controller is able to communicate with each shelf utilizing categories of communication signals. The connection system comprises connections providing signalling links for the categories of communication signals between the controller and each shelf. The connections are bundled together in a single, collective span of cable and each connection provides its individual category of communication signals independently of the other connections.

The single, collective span of cable may have a first end having a connector adapted to provide connections for each connection to the controller and a second end having a second connector adapted to provide connections for each connection to each shelf. The first and second connectors may have physical profiles which do not allow the first connector to be connected with the shelf and the second connector with the controller.

The connection system may have one of the connections adapted to carry E1 frame format signals.

The connection system may have a second connection adapted to carry Ethernet format signals.

The connection system may have a third connection is adapted to carry RS 485 format signals.

The connection system may have one of the connections adapted to carry timing synchronization signals for the communication switch.

The connection system may have the timing synchronization signals comprise a first set of timing signals generated by the controller and transmitted on one of connections to each shelf, a second set of response timing signals generated by each shelf and transmitted on the connection to the controller and a third set of synchronization signals generated by the controller and transmitted on the connection to each shelf. The second set of timing signals is related to local timing signals related to each shelf The third set of synchronization signals are synchronized to one of the local timing signals.

In other aspects of the invention, various combinations and subset of the above aspects are provided.

In another aspect, a multi-shelf network element for a telecommunications network is provided. The network element comprises: a plurality of shelves, each shelf having network interface cards and each network interface card being coupled to a respective inter-shelf interface card; a switch fabric coupled to the each respective inter-shelf interface cards card for switching telecommunications traffic between the network interface cards; a connection controller operable to establish connections between the network interface cards through the inter-shelf interface cards and switch fabric; and a link coupled to the connection controller, the switch fabric, and the plurality of shelves for transmitting commands from the connection controller to the switch fabric and the plurality of shelves. The link has a plurality of connections providing signalling links for a plurality of categories of communication signals for transmitting the commands. The plurality of connections are bundled together in a single, collective span of cable and each connection of the plurality of connections provides an individual category of the plurality of categories of communication signals independently of the other connections of the plurality of connections. The single, collective span of cable comprises a first end having a connector adapted to provide connections for each connection of the plurality of connections to the controller and a second end having a second connector adapted to provide connections for each connection of the plurality of connections to the plurality of shelves. The first and second connectors have physical profiles which do not allow the first connector to be connected with the plurality of shelves and the second connector with the controller.

The connection controller may further be operable to distribute a synchronizing clock signal to the plurality of shelves and the switch fabric by the link in an E1 frame format. The connection controller may further be operable to create a time-of-day stamp which is distributed to the plurality of shelves by the link in a RS 485 signaling format. The connection controller may further distribute the time-of-day stamp to one shelf of the plurality of shelves when a connection through the one shelf is established.

The commands may include a severe fault reporting command, and the connection controller may further distribute the severe fault reporting command to the plurality of shelves and the switch fabric by the link in an E1 frame format. The commands may also include a software download command, and the connection controller may further distribute the software download command to at least one shelf of the plurality of shelves in an Ethernet signaling format. The commands may further include an update local tables command, and the connection controller may further distribute the update local tables command to at least one shelf of the plurality of shelves in an Ethernet signaling format. Still further, the commands may include at least one of an initiate connection or a tear-down connection command, and the connection controller may further distribute the at least one command to the switch fabric and the plurality of shelves in an Ethernet signaling format.

In another aspect, a method for distributing information in a multi-shelf network element in a communication network is provided. The multi-shelf network element has a controller, a plurality of shelves providing communication capabilities for the network element and a plurality of control service links (CSLs). Each control service link (CSL) of the plurality of CSLs is connected to a respective shelf of the plurality of shelves. Each CSL has a plurality of connections that provides signaling paths for a plurality of categories of communication signals between the controller and a respective shelf of the plurality of shelves. The method comprises transmitting individual categories of the plurality of categories of communication signals over separate connections of the plurality of connections between the controller and each of the plurality of shelves independently of the other connections of the plurality of connections. The plurality of connections are bundled together in a single, collective span of cable comprising a first end having a connector adapted to provide connections for each connection of the plurality of connections to the controller and a second end having a second connector adapted to provide connections for each connection of the plurality of connections to the each shelf. The first and second connectors have physical profiles which do not allow the first connector to be connected with the shelf and the second connector with the controller.

The information may include a synchronizing clock signal, and the at least one of the plurality of categories of communication signals may include an E1 frame format. The information may include a time-of-day stamp, and the at least one of the plurality of categories of communication signals may include a RS 485 signaling format. The information may include a severe fault reporting command, and the at least one of the plurality of categories of communication signals may include an E1 frame format. The information may include at least one of an initiate connection or a tear-down connection command, and the at least one of the plurality of categories of communication signals may include an Ethernet signaling format.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
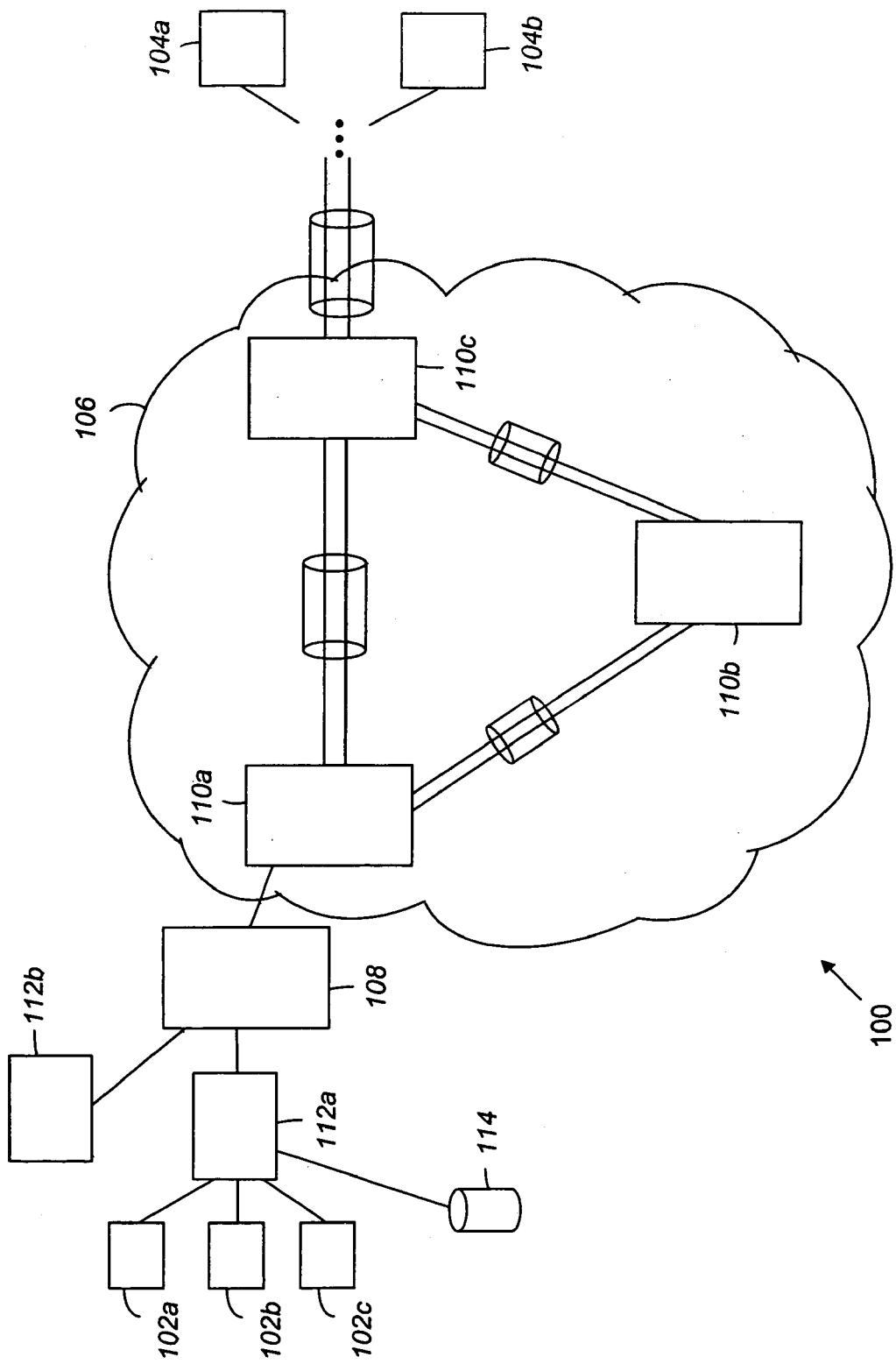
FIG. 1 is a block diagram of a communication network incorporating a switch embodying the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

For general introduction, the following is a description of a network associated with the switch associated with the embodiment. Briefly, the system of the embodiment provides a system for processing data traffic through a routing system or communication switch utilizing a redundant data switching fabric or datapath.

Referring to FIG. 1, a communication network 100 is shown. Network 100 allows devices 102A, 102B, and 102C to communicate with devices 104A and 104B through network cloud 106. At the edge of network cloud 106, switch 108 is the connection point for devices 102A, 102B and 102C to network cloud 106. In network cloud 106, a plurality of switches 110A, 110B and 110C are connected forming the communications backbone of network cloud 106. In turn, connections from network cloud 106 to devices 104A and 104B. Network 100 may also include devices 112, 112b and data storage device 114. It will be appreciated that in other embodiments devices in a network may be added or deleted, and devices and their functions may be interchangeable.

Switch 108 incorporates the control signal system and method of the embodiment. It will be appreciated that terms such as "routing switch", "communication switch", "communication device", "switch" and other terms known in the art may be used to describe switch 108. Further, while the embodiment is described for switch 108, it will be appreciated that the system and method described herein may be adapted to any switching system, including switches 110A, 110B and 110C.

Figure 2A:
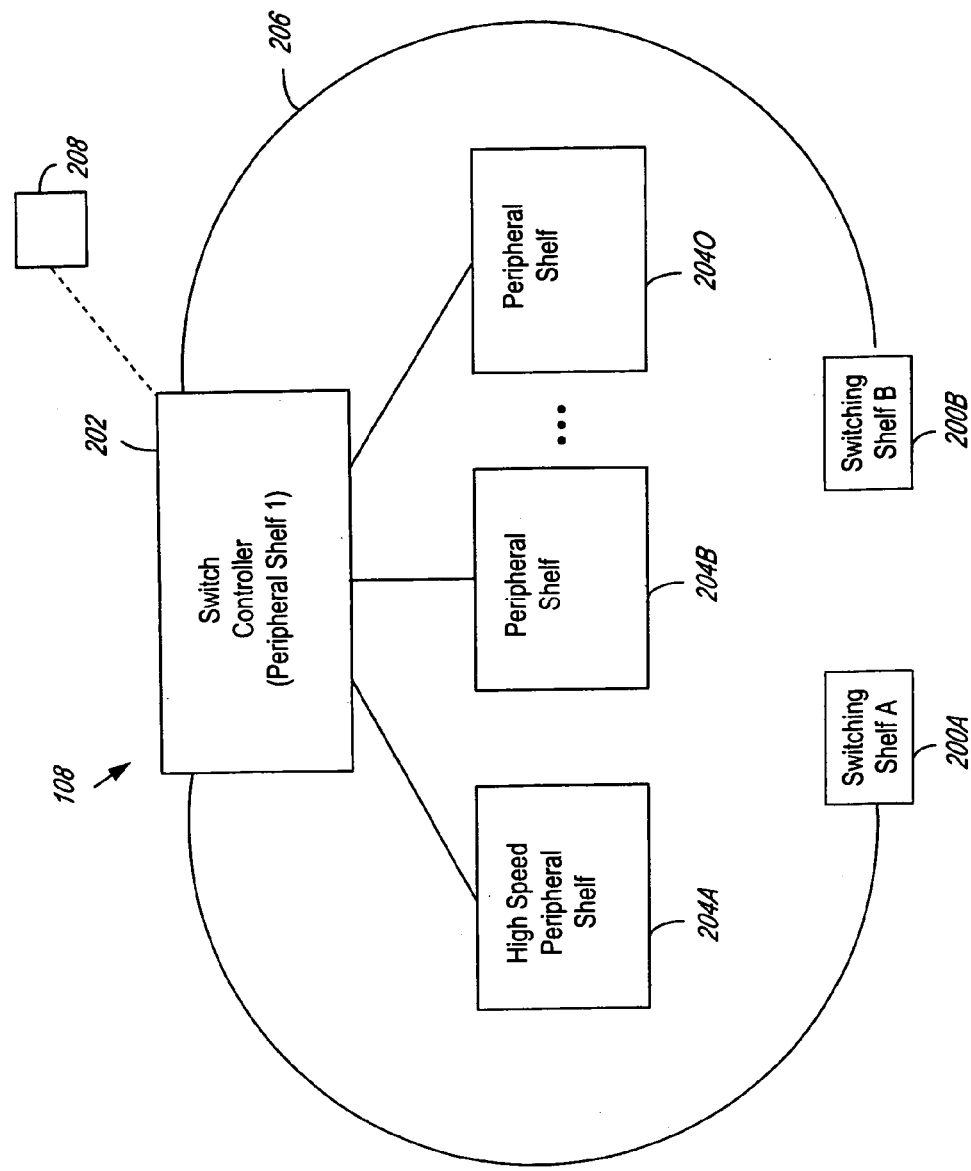
FIG. 2A is another block diagram of components of the switch of FIG. 1.
Figure 2B:
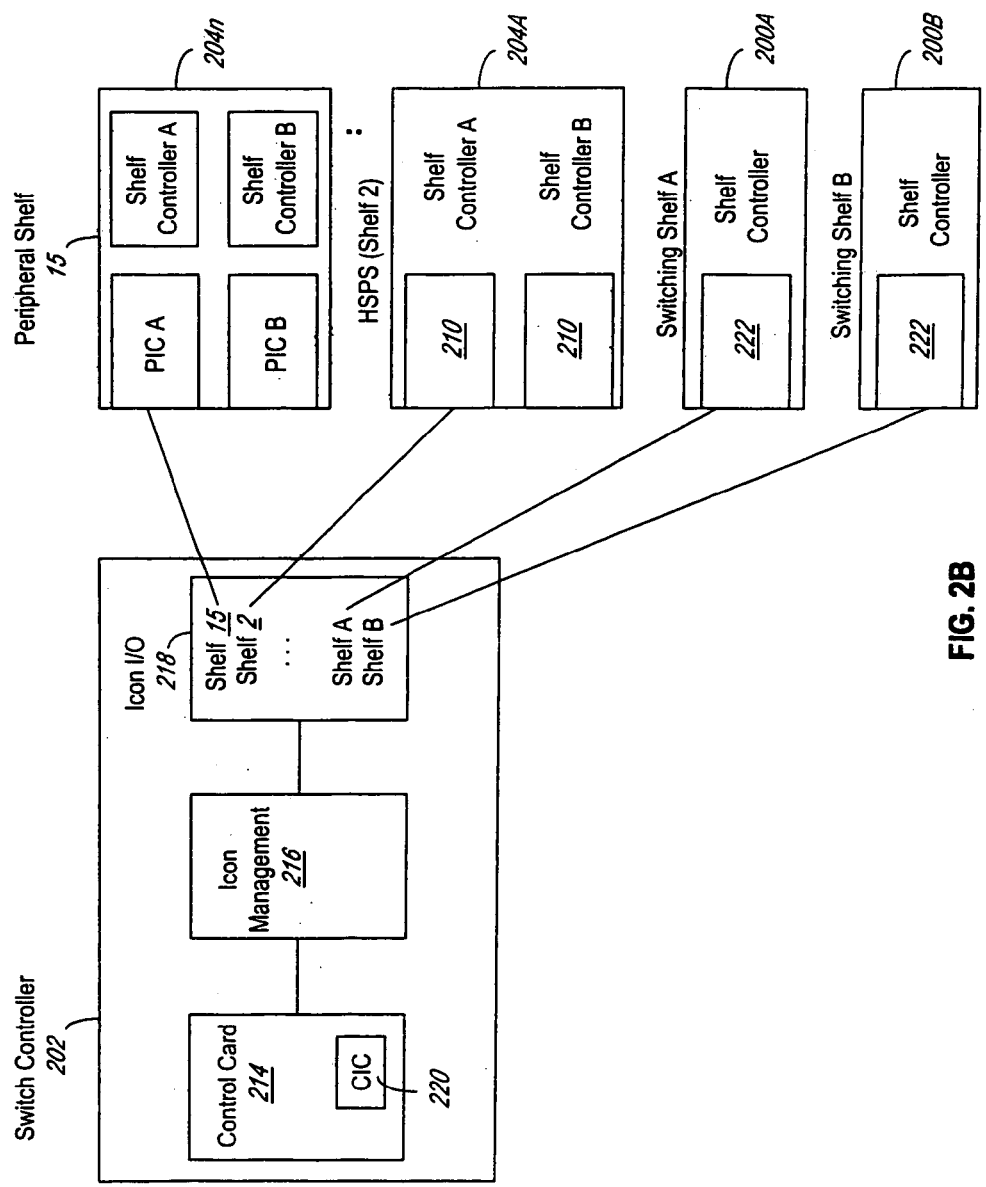
FIG. 2B is another block diagram of components and connections of the switch of FIG. 2A.

Following is a general description of the main elements of a switch for the control signal system and method of the embodiment. Referring to FIGS. 2A and 2B, switch 108 is a multi-shelf switching system comprising a number of shelves, including two switching shelves 200A and 200B, switch controller 202 and peripheral shelves 204A . . . 204O (providing a total of 15 peripheral shelves). Switching shelves 200A and 200B provide cell switching capacity for switch 108. Switch controller 202 provides input/output for the switch 108. Peripheral shelves 204 provide I/O for switch 108, allowing connection of devices, like customer premise devices (CPEs) 102A, 102B, and 102C to switch 108. Switch controller 202 is a separate shelf with control cards, which provide central management for switch 108. Aspects relating to datastream switching is not provided herein, unless it pertains to a control aspect of switch 108.

Communication links enable switch controller 202 to communicate with switching shelves 200, peripheral shelves 204. Control Service Links (CSLs) 206 are individual communication links which connect link switch controller 202 with switching shelves 200A and 200B, and peripheral shelves 204 . . . 204O. Further detail on CSL links 206 is provided below.

Terminal 208 is connected to switch 108 and runs controlling software, which allows an operator to modify, and control the operation of, switch 108.

Referring to FIG. 2B, there are two types of peripheral shelves 204. The first type is a High Speed Peripheral Shelf (HSPS), represented as peripheral shelf 204A. Peripheral shelf 204A contains two redundant High Speed Shelf Controllers (HSC) cards 210. For the data plane, High Speed Line Processing (HLPC) Cards, I/O cards, High Speed Fabric Interface Cards (HFIC) are also provided, but not shown. The second type is a Peripheral Shelf (PS), represented as peripheral shelf 204B. Peripheral Interface Cards 212, Line Processing Cards, I/O cards and Peripheral Fabric Interface Cards (not shown) are provided for the data plane.

Switch controller 202 comprises a control card 214, an inter-connection (ICON) card 216, ICON-I/O card 218, a Control Interconnect Card (CIC card) 220 associated with the control card 214 and a Facilities Card (FAC card) (nor shown). The ICON card 216 provides the interface for connecting the switch controller 202 to all peripheral shelf controllers on the other shelves 200, 204 in the switch 108. The CIC 220 provides an interface to communicate with line cards in switch controller 202.

FIG. 2B illustrates CSL 206 connections between various peripheral devices to the switch controller 202. As shown, each high speed peripheral shelf 204B has a pair of redundant shelf controllers 210A and 2101B each connecting the peripheral shelf 204 to an ICON I/O interface card 218 via CSL 206. Similarly, each peripheral shelf 204A has a pair of redundant shelf controllers 210A and 210B each connecting the PS 204A to the ICON I/O interface card 218, again via CSL 206. As seen, the embodiment utilizes redundant cards and connections in its architecture.

Still referring to FIG. 2B, a switching shelf 200A has a shelf controller 222 connecting the switching shelf 200A to ICON I/O interface card 218. Also, a switching shelf 2001B has a shelf controller 220B connecting the switching shelf 200B to ICON I/O interface card 218. The connection examples shown in FIG. 2B illustrate the flexibility in the architecture in accommodating many different types of peripheral devices and redundant connections. However, it will be understood the examples shown in FIG. 2B are not limiting. Many alternative designs are possible showing different interconnections.

Still referring to FIG. 2B, ICON I/O interface card 218A is connected to ICON management card 216. ICON management card 216 is in turn connected to control card 214. Again, the embodiment may utilize redundant cards within switch controller 202 and may connect them to provide multiple paths between each component.

Aspects relating to the communication of signals between control card 214 to each of peripheral shelf 204, high-speed peripheral shelf 204 and switching shelf 200 is now described.

As noted above, switch controller 202 provides control operations for switch 108. Control commands are initiated via elements in control card 214 (described later) and are converted to signals which are transmitted to the target shelves.

It will be appreciated that different control commands will have different bandwidth and timing requirements. In the embodiment, there are four categories of control commands which have different timing sensitivities. The first category of commands has a low bandwidth requirement for its transmission from the switch controller to the destination; however, the commands have a sensitive time requirements for transmission and receipt of the commands. This first category of commands includes commands such as reporting severe faults in a fabric and initiating switching of fabrics. A second category of commands relate to servicing functions for the switch 108. These types of commands may have high bandwidth requirements, but may not have critical timing issues. Examples of the second category of commands include commands to download software, update local tables and initiate or tear down a connection. A third category of timing commands include time of day distribution commands. Commands in this third category are used during usage billing calculations. There may not be a critical timing issue for these commands. A fourth category of commands relates to clocking synchronization. It is necessary to synchronize clock signals amongst the switch controller 202 and the peripheral shelves 204A and 204B and the switching shelves 200A and 200B.

It will be appreciated that each of the four categories of timing commands may be carried over a single control transmission datastream. However, due to the conflicting features of the timing requirements for the categories, it will be appreciated that it may not always be possible to combine all of the four categories together. For example, the high bandwidth, low priority service requirements of the second category of command signals may conflict with the low bandwidth, high priority service requirements of the first category of commands.

Accordingly, the embodiment provides four separate transmission systems for encoding and transmitting the control signals from the switch controller 202 to the other shelves, namely high speed peripheral shelf 204, peripheral shelves 204B . . . 204O, and switching shelves 200A and 200B. In the embodiment, the following types of signalling protocols are used for each of the four categories of commands:

(i) for the first category of low bandwidth, high priority commands signals, an E1 communication transmission protocol is used;

(ii) for the second category of high bandwidth, lower priority commands, an Ethernet signalling transmission protocol is used;

(iii) for the third category of time of day distribution signalling, a real time signalling (RTS) protocol is used which utilizes electrical characteristics for its signalling per the known RS 485 convention; and (iv) for the fourth category of commands, commands are provided via an embedded E1 signalling transmission protocol. The fourth category utilizes features of a known signalling protocol (as will be described later) which is inherent to the E1 communication link used by the first category of commands.

It will be appreciated that other signalling protocols may be used for any of the four categories of commands, as long as the selected protocols meet the requirements for their respective category, such as timing and bandwidth. It will be also appreciated that when possible, it may be possible to combine one or more of the four categories into a single or multiple set of signals, appropriately modulated on top of each other, to achieve both the transmission requirements for the respective category and also combining the physical transmissions into one or more communication links.

Figure 3A:
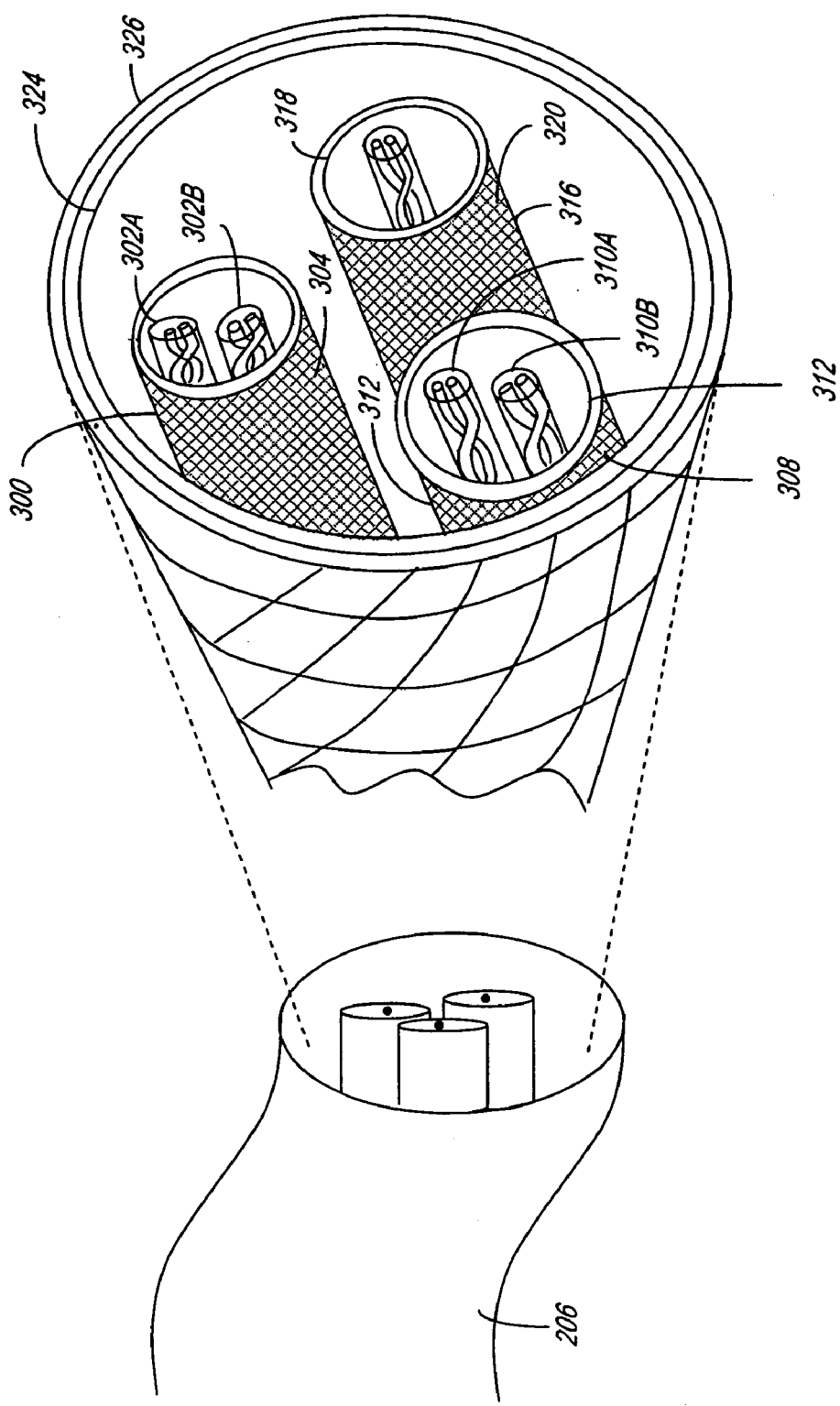
FIG. 3A is a block diagram of a cabling system of the switch of FIG. 2A.

Referring to FIG. 3A, for the embodiment, E1 transmissions are carried over two twisted pairs of wire 302A, 302B with one twisted pair 302A carrying communications downstream from the switch controller 202 to the connected shelf and another twisted pair 302B of wire carrying E1 encoded communications from the shelf to the switch controller 202. In the embodiment, the two sets of twisted pairs are grouped together as a set of four conductors twisted together. Similarly, for Ethernet communications, two pairs of twisted wires 310A, 310B are provided from switch controller 202 to the connected shelf, with one pair of wires 310A providing a downstream link from the switch controller 202 to the connected shelf and another twisted pair of wires 310B to carry communications upstream from the connected shelf to the switch controller 202. Again, the two pairs of conductors are grouped together as a set of four conductors twisted together. For RTS signals, a single pair of twisted wires 318 is provided from the switch controller 202 to the connected shelf. As this is a broadcast-type of transmission, no response is required from any of the shelves. Accordingly, no upstream communication link is provided for the RTS signalling. For the fourth category, appropriate signals inherent to the E1 protocol provided as part of the E1 transmission standard for the first category signals are utilized at each end of the existing E1 link.

Figure 3B:
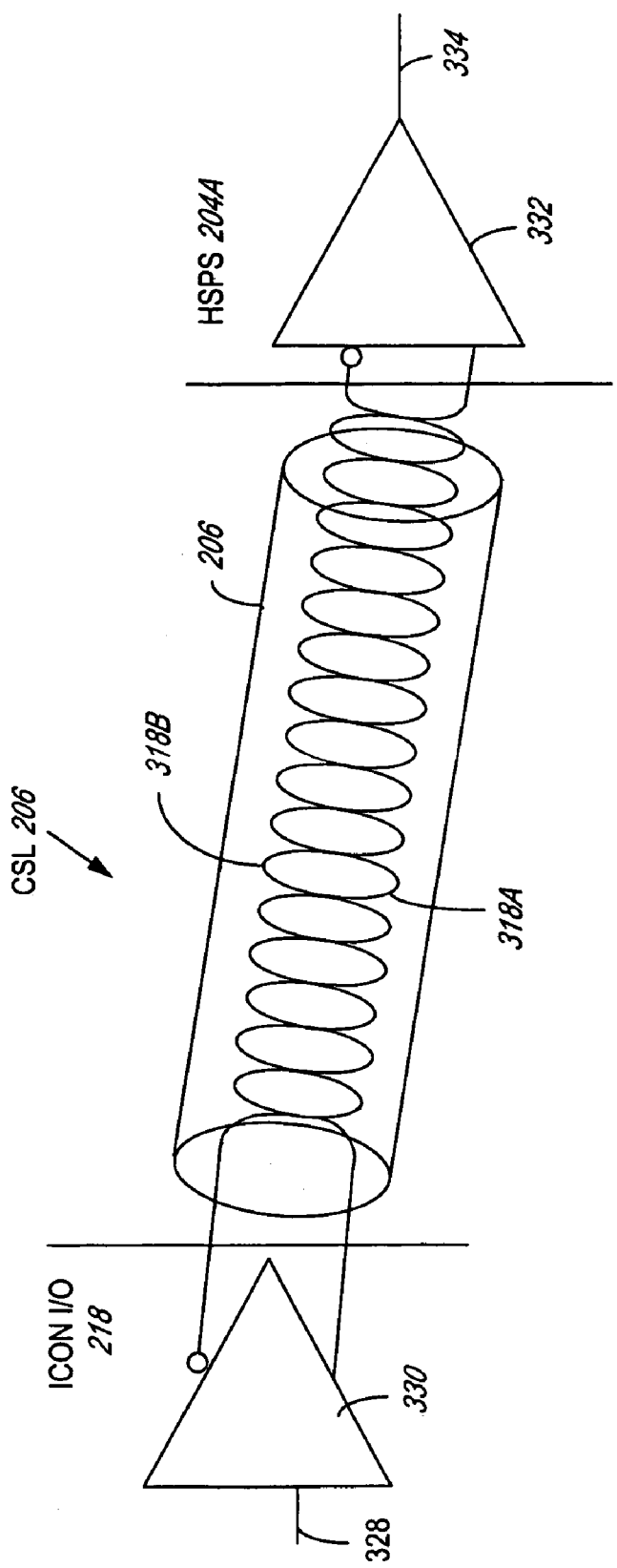
FIG. 3B is a block diagram of a RTS signalling circuit associated with an RTS cable associated with the cabling system of FIG. 3A.

Referring to FIG. 3A, each of the distinct transmission protocols, namely E1, Ethernet and RTS, are carried on separate conductors, but the embodiment physically groups together each of the three types of conductors together in a single common link. This link is CSL 206, described earlier. In CSL 206, E1 cable 300 comprises twisted pairs of conductors 302A and 302B. In FIG. 3A, conductors 302A and 302B are illustrated as separate pairs, but as described earlier, the embodiment has the two pairs twisted together. Conductors 302A and 302B are collectively shielded in a metal foil layer 304. Ethernet cable 308 comprises twisted pairs, of cables 310A and 310B. Again, pairs 310A and 310B are illustrated, for clarity, as separate pairs. As with E1 cable 300, cables 310A and 310B as surrounded in a metal foil layer 312. The RTS cable 316 comprises a twisted pair of wires 318. In the embodiment, two pairs of conductors twisted together are provided in cable 316; however, for the sake of clarity, only one pair of wires 318 is illustrated in FIG. 3B. Again, twisted pair 318 is surrounded by a metal foil 320. Finally, cables 300, 308 and 316 are collectively surrounded by another metal foil lawyer 324 and a metal braid 326. An appropriate exterior sheathing may be provided to protect any or all of the cables. In other embodiments, the above noted pairs of conductors may not be twisted together. Accordingly, it will be appreciated that CSL cable 206 individually isolates each cable from its neighbours and collectively isolates the set of cables from RFI and EMI external interference. It will be appreciated that cable 206 provides a single run of grouped cables 300, 308 and 316 which are jointly terminated at single connectors at each end of cable 206. Accordingly, cable 206 provides a single connection system for controller 202 to each shelf 204 and 200 which provides all four categories of communication signals. Cable 206 may be terminated at each end with a physically unique connector to prevent miscabling of cable 206 between shelves and in incorrect orientations. It will be appreciated that the term for cable 316 is synonymous with other terms, such as conductor, connection and link.

Referring to FIG. 3B, further detail on the RTS cable 318 is shown, for an exemplary connection between switch controller 202 and HSPS 204A. To produce the signal that is carried upon RTS link 316, at the interface point of ICON card 218, the original RTS signal carried on line 328 is provided to differential amplifier 330. The voltage level of signals on line 328 is generally 3.3 volts. Differential amplifier produces a differential signal modulating about zero volts. The differential signal is in RS 485 format and has a value of approximately 300 mV. The differential signal is provided to RTS link 318 on lines 318A and 318B. At HSPS 204A, CSL 206 provides a connection to differential receiver 332. The differential receiver converts the received signal on lines 318A and 318B into a DC signal and outputs the signal on line 334. The output produced on line 334 is a 3.3 volt signal. The signal can then be used by HSPS 204A. For RTS connections for the peripheral switch controller and the switching shelf controller, a comparable RTS connection, as described above, is provided.

Following is a description of each of the elements in the switch controller 202 and each of the peripheral shelves, 204B, high speed peripheral shelf 204A and switching shelf 200.

Figure 4:
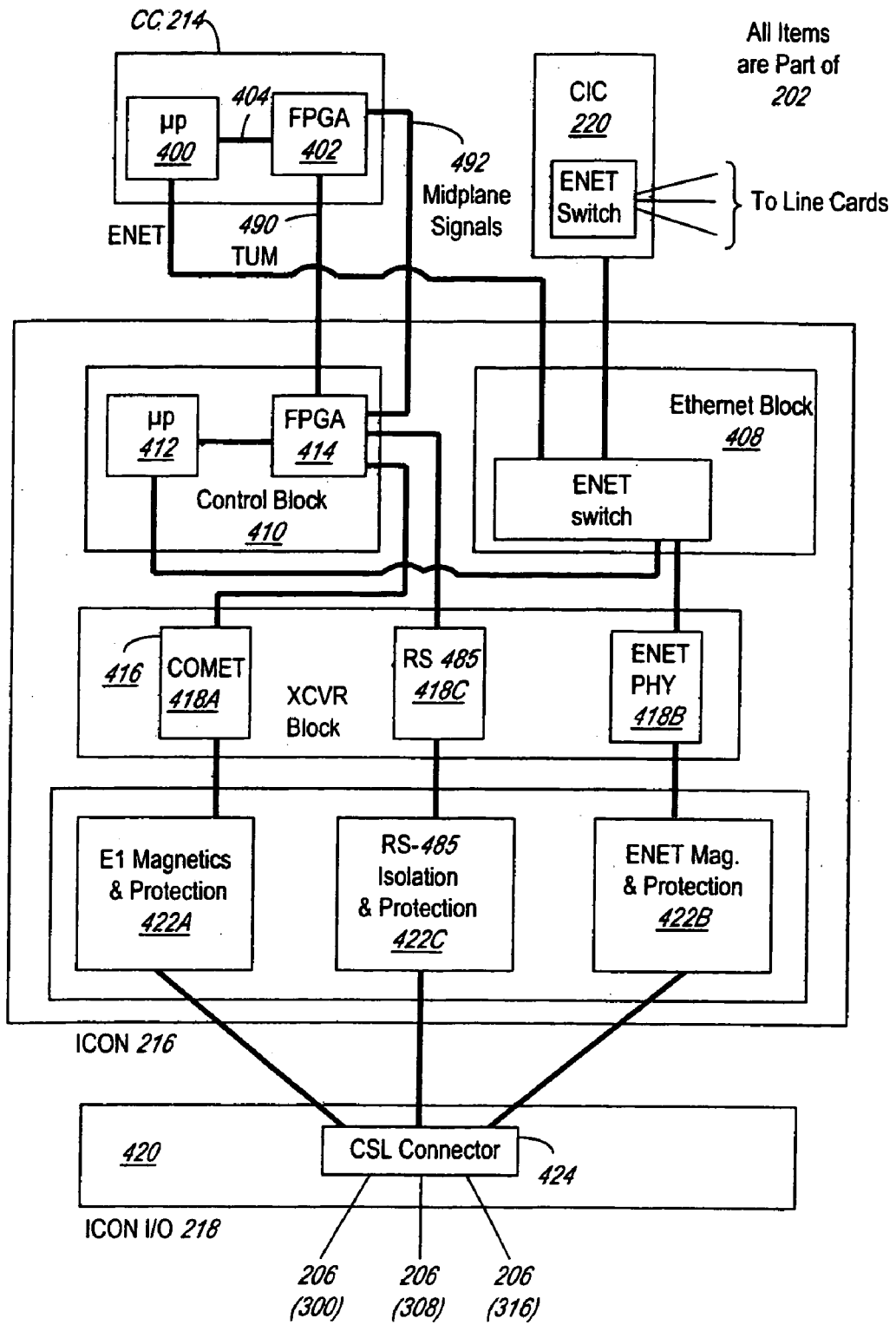
FIG. 4 is a block diagram of a controller card of a control shelf of the switch of FIG. 2A.

First, a description is provided of each of the elements in each of the shelves related to the E1 transmissions. Referring to FIG. 4, in switch controller 202, control card 214 comprises microprocessor 400 and FPGA 402. ICON card 216 comprises Ethernet switch block 408, control block 410, transceiver block 416 and isolation modules 420. In control block 410, microprocessor 412 operates software which controls ICON card 216. Periodically, the software operating on microprocessor 400 may initiate a command which falls into the first category of commands, described earlier. Accordingly, the software operating in microprocessor 400 sends to FPGA 402 via link 404 a message that a first category command is to be sent. The FPGA 402 generates an appropriate message and sends it via 490 or 492 (depending on the data) to ICON card 216.

For an E1 command, within ICON card 216, FPGA 414 provides same to control block 410. Control block 410 comprises microprocessor 412 and FPGA 414. Accordingly, an E1 message is generated and the message is provided to transceiver block 416. Within transceiver block 408, the E1 message is routed to E1 framer 418A. E1 framers are known in the art. E1 framer 418A frames the E1 message per the recognized protocol and sends it to external interface block 420. Within external interface block 420, the E1 transmission is received by E1 magnetics and protection block 422A which electrically isolates the signal from the rest of the cable 206. Next, the E1 signal is provided to a physical termination point in ICON I/O card 218, namely CSL connector 424. CSL connector 424 has appropriate terminations which allow a connected CSL link 206 to connect its E1 cable 300 to the appropriate terminal in CSL connector 424. From that point, the E1 communications are carried over to the connected shelf by CSL cable 206.

Figure 5:
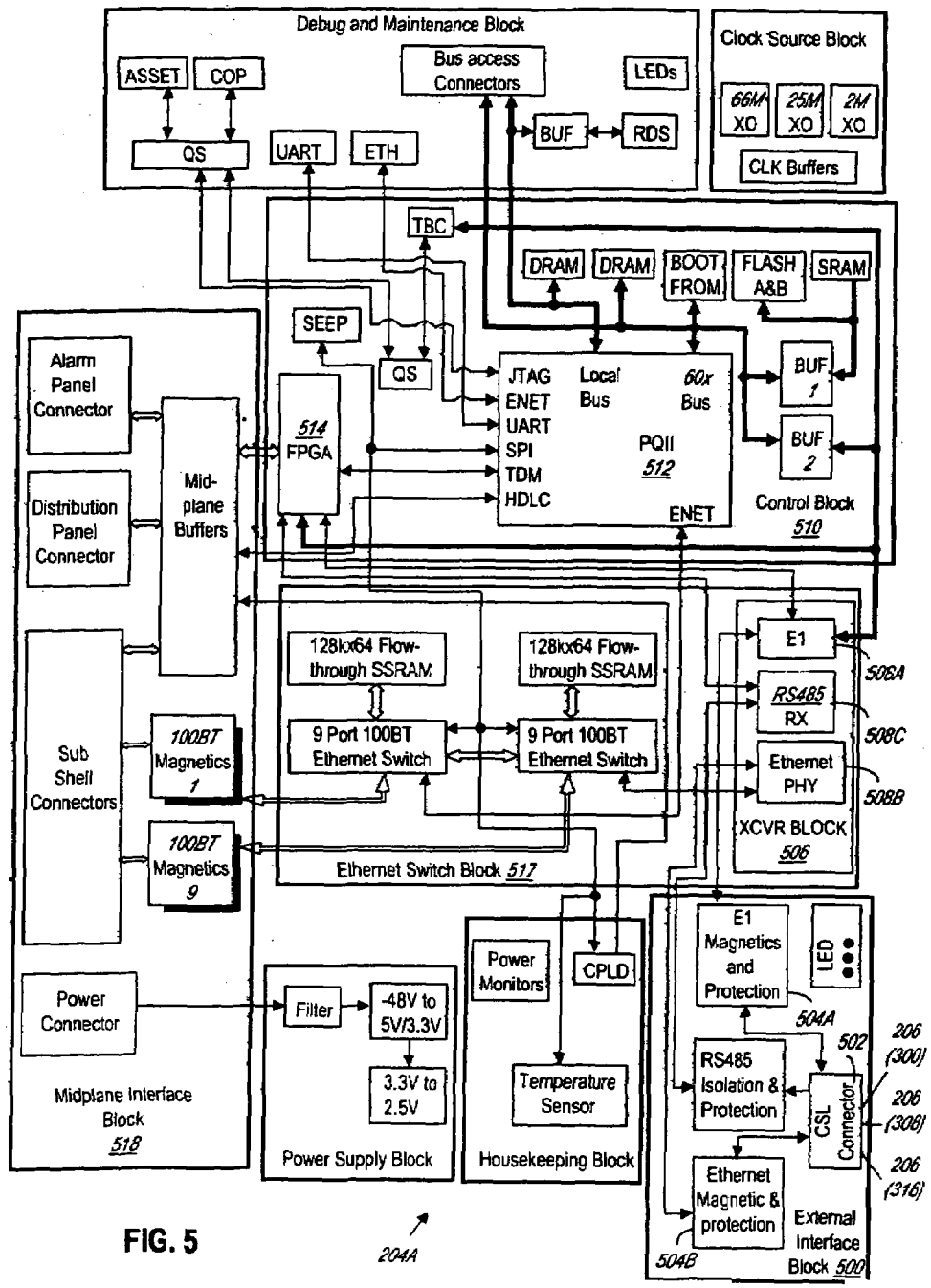
FIG. 5 is a block diagram of a shelf controller card of a high speed peripheral shelf associated with the switch of FIG. 2A.

Referring to FIG. 5, elements relating to the processing of the E1 communication protocol 110 are shown for high speed peripheral shelf 204A. First, CSL link 206 connects to external interface block 500 at CSL connector 502. CSL connector 502 provides an appropriate connection from CSL cable 206 to the interface portion for E1 transmission protocol processing for high speed peripheral shelf 204A. Accordingly, from CSL connector 504, E1 signals are provided to E1 magnetics and protection block 504A which provides electrical isolation of high speed peripheral shelf 204A from E1 signals carried upon CSL link 206. From external interface block 500, the E1 communications stream is provided to transceiver block 506. Within transceiver block 506, the E1 signals are received by E1 framer 508A which appropriately unframes the E1 signal. The unframed E1 signal is then provided to control block 510. Therein, microprocessor 512 and FPGA 514 collectively operate to decode the E1 signal to identify the message contained therein and the destination of the message into an appropriate DC signal, providing a midplane signal which can be provided to line card 516.

In the embodiment, a toggling signal is generated and sent by a shelf controller to indicate its activity status to its associated line card. The activity status of a shelf controller is either active, inactive, a request to be active or a fault. A request to be active is typically generated on startup of the switch. In particular, in a shelf controller the toggling signal is generated by FPGA 514. For example, if the shelf controller is being switched from an active state to an inactive state, the signal provided by FPGA 514 to line card 516 is a "slow toggle" signal. If die shelf controller is being switcbed from an inactive state to an active stat; the signal provided by FPGA 514 to line card 516 is a "fast toggle" signal. If a "medium toggle" signal is generated by FPGA 514, a request to be active is sent from the shelf controller. If the signal is DC value, i.e. no toggle, then an error condition is present in the shelf controller.

In the embodiment, the protocol parameters of E1 communications enables time sensitive commands to be encoded and sent from switch controller 202 to various remote shelves.

It will be appreciated that communications from line card 516 destined for switch controller 202 which are encoded in E1 format may be processed by the earlier described modules for controller 202 in a similar fashion, as described above but for the flow of data occurring in the upstream direction. Upstream E1 transmissions are carried on CSL link 206 via cables 302B.

Following is a description of Ethernet communications from switch controller 202 to line card 516. Referring to FIG. 4, software operating on microprocessor 400 determines that a download of updated software, for example, is necessary for line card 516. Microprocessor 400 sends a message directly to ICON card 216. In ICON card 216, the Ethernet message is received at Ethernet switch 408 and provided directly to the Ethernet PHY block 418B of transceiver block 416. From transceiver block 416, the Ethernet encoded message is provided to external interface block 420. Therein, the signal is provided to Ethernet magnetics and protection block 424B. Therefrom, the Ethernet signal is provided to CSL connector 424 which has appropriate connections to CSL cable 206 to cables 308. From that point, the Ethernet message is sent over CSL 206 to the connecting HSPS 204A.

Referring to FIG. 5, the Ethernet message in CSL 206 is received at external interface block 500 at CSL connector 502. The Ethernet stream is directed to Ethernet magnetics and protection block 504B. Therefrom, the Ethernet message is provided to transceiver block 506 and Ethernet PHY conversion block 508B. From PHY block 508B, the Ethernet message is provided to Ethernet switch block 516. Ethernet switch block 516 routes the Ethernet message to midplane interface block 518 which then provides the Ethernet signal to line card 516.

It will be appreciated that communications from line card 516 to switch controller 202 which are carried over our Ethernet link may be processed by the above described Ethernet modules in a similar fashion as described above, but for the flow of data occurring in the upstream direction. Ethernet transmissions are carried over CSL link 206 via cables 310B. Ethernet messages may also be provided to local microprocessors in ICON card 216 and shelf controller 210.

In the embodiment, it will be appreciated that Ethernet transmissions may be transmitted from its source directly to the line card 516. Whereas with E1 communications, in the embodiment it is not possible to send some transmissions from ultimate source to ultimate destination without having an intervening protocol introduced to transmit the message to the "last mile", i.e the component. It will be appreciated that in other embodiments, other modules may be provided to allow "end-to-end" transmissions of any given protocol for any given signal.

The following is a description of the transmission of RTS signals from switch controller 202 to line card 516. The RTS signalling system provides a time stamp to all line cards 516. The RTS pulse has an embedded date value. The RTS signal allows a local card to synchronize with a clock using an offset value contained in the signal. The time stamp provides 100 ms of synchronization accuracy between cards 516 on different shelves. To accomplish this, two counters are used in RTS receivers to generate a universal time stamp: a local high resolution (1 us) counter and a low resolution counter. The low resolution signal is sent over the RTS link 316. The receipt of the low-resolution signal provides a stimulus to initiate a free-running counter which is used to generate the high-resolution portion of the timestamp. For the low-resolution counter, it has a value derived from a PWM signal generated from the switch controller 202. The sequence of values in the low resolution counter is a pseudo-random number and is provided in an accessible software table. Accordingly, a look-up must be performed at line card 516 to determine the offset time indicated by the low resolution counter. At line card 516 the result of this look-up is combined with the local high resolution counter to provide a local time stamp having micro-second precision.

Referring to FIG. 4, for a time stamp signal, software operating on microprocessor 400 in switch controller 202 sends a base time signal on Ethernet link 494 to ICON card 216. FPGA 402 generates a pulse width modulation (PWM) signal encoding the RTS message and provides same to ICON module 216 via link 492. Within ICON module 216, the RTS message is received at control block 410. Therein FPGA 414 cause the generation of a broadcast signal which will be "fanned out" to each of the connected HSPS cards for 204A. Accordingly, in "fanning out" the signal, control block 410 provides the received RTS message to RS 485 transmitter 422C in transceiver block 416. From transceiver block 416, the message is provided to external interface block 420 and RS 485 isolation and protection module 422C. From there, the isolation block 422C has a connection to the appropriate RTS links in CSL connector 424. Accordingly, the RTS signal is carried upon appropriate CSL cable(s) 206 and wires 316 to each shelf.

Referring to FIG. 5, at a particular shelf the RTS message is received from CSL cable 206 at CSL connector 502 in external interface block 500. From the connector 502, the RTS signal is provided to RS 485 isolation and protection block 504C which electrically isolates the HSPS 204A from CSL 206. From external interface block 500, the RTS signal is provided to transceiver block 506. In transceiver block 506, the signal is provided to RS 485 receiving block 508C and then, the RTS signal is provided to control block 510. Therein, FPGA 514 generates signals to distribute the RTS signal locally to each connected line card 516 or other elements which have a microprocessor.

The following is a description of the fourth category of commands. As noted earlier, the embodiment provides synchronization for all clocks distributed in the system, namely the controller clocks on the switch controller 202 and the each of the shelves. The following signalling method is used which is transmitted by piggy backing the signals on the E1 communications stream.

First, a description of the general parameters of the timing mechanism is provided. As each of the I/O sources are operating on different SONET rings, the embodiment provides a method of synchronizing all timing aspects amongst each of the rings. Essentially, the switch controller 202 receives timing information from each of the distributed elements, namely line cards 516 etc. Initially an arbitrary clock signal is generated by the switch controller 202 as the synchronization signal. Next, the peripheral shelf 204 recovers the timing signal from the E1 channel driven by switch controller 202. Next, shelf controller 204 calculates a digital phase word and places the word in the TDM stream, which is transmitted to switch controller 202. Then switch controller 202 notifies shelf controller 204 of which line card 516 is to be used to calculate the digital phase word. Finally, ICON management card 216 utilizes the clock signal provided by switch controller 202 to synchronize E1 framers such that all shelf controllers 204 and 200 receive the same synchronization signal.

It will be appreciated that the embodiment provides a single connection point between heterogeneous cabling systems having common beginning and termination points. Also, the embodiment provides a system of transmitting heterogeneous signalling protocols to various shelves. It will further be appreciated that the embodiment may be used between any shelves or components in the switch requiring a plurality of signalling systems.

It is noted that those skilled in the art will appreciate that various modifications of detail may be made to the present embodiment, all of which would come within the scope of the invention.

We claim:

1. A connection system for a communication switch comprising a controller and a plurality of shelves providing communication capabilities for said communication switch, said controller being able to communicate with each shelf of said plurality of shelves utilizing a plurality of categories of communication signals, said connection system comprising;
   a plurality of connections providing signalling links for said plurality of categories of communication signals between said controller and said each shelf of said plurality of shelves,
   wherein
   said plurality of connections are bundled together in a single, collective span of cable and each connection of said plurality of connections provides an individual category of said plurality of categories of communication signals independently of the other connections of said plurality of connections;
   said single, collective span of cable comprises a first end having a connector adapted to provide connections for each connection of said plurality of connections to said controller and a second end having a second connector adapted to provide connections for each connection of said plurality of connections to said each shelf; and
   said first and second connectors have physical profiles which do not allow said first connector to be connected with said shelf and said second connector with said controller.

2. A connection system as claimed in claim 1 wherein one of said plurality of connections is adapted to carry E1 frame format signals.

3. A connection system as claimed in claim 2 wherein a second of said plurality-of connections is adapted to carry Ethernet format signals.

4. A connection system as claimed in claim 3 wherein a third of said plurality of connections is adapted to carry RS 485 format signals.

5. A connection system as claimed in claim 4 wherein one of said plurality of connections is adapted to carry timing synchronization signals for said communication switch.

6. A connection system as claimed in claim 5 wherein said timing synchronization signals comprise:
   a first set of timing signals generated by said controller and transmitted on said one of said plurality of connections to each of said plurality of shelves;
   a second set of response timing signals generated by each of said plurality of shelves and transmitted on said one of said plurality of connections to said controller, said second set of timing signals related to local timing signals related to each of said plurality of shelves; and
   a third set of synchronization signals generated by said controller and transmitted on said one of said plurality of connections to each of said plurality of shelves, said third set of synchronization signals synchronized to one of said local timing signals.

7. A multi-shelf network element for a telecommunications network, comprising:
   a plurality of shelves, each shelf having network interface cards and each network interface card being coupled to a respective inter-shelf interface card;
   a switch fabric coupled to said each respective inter-shelf interface card for switching telecommunications traffic between the network interface cards;
   a connection controller operable to establish connections between the network interface cards though the liner-shelf interface cards and the switch fabric; and
   a link coupled to the connection controller, the switch fabric, and the plurality of shelves for transmitting commands from the connection controller to the switch fabric and the plurality of shelves, the link having a plurality of connections providing signalling links for a plurality of categories of communication signals for transmitting the commands, wherein
   said plurality of connections are bundled together in a single, collective span of cable and each connection of said plurality of connections provides an individual category of said plurality of categories of communication signals independently of the other connections of said plurality of connections;
   said single, collective span of cable comprises a first end having a connector adapted to provide connections for each connection of said plurality of connections to said controller and a second end having a second connector adapted to provide connections for each connection of said plurality of connections to said plurality of shelves; and
   said first and second connectors have physical profiles which do not allow said first connector to be connected with said plurality of shelves and said second connector with said controller.

8. The multi-shelf network element of claim 7, wherein the connection controller is further operable to distribute a synchronizing clock signal to the plurality of shelves and the switch fabric by the link in an E1 frame format.

9. The multi-shelf network element of claim 7, wherein the connection controller is further operable to create a time-of-day stamp which is distributed to the plurality of shelves by the link in a RS 485 signaling format.

10. The multi-shelf network element of claim 9, wherein the connection controller further distributes the time-of-day stamp to one shelf of the plurality of shelves when a connection through the one shelf is established.

11. The multi-shelf network element of claim 7, wherein the commands include a severe fault reporting command, and the connection controller further distributes the severe fault reporting command to the plurality of shelves and the switch fabric by the link in an E1 frame format.

12. The multi-shelf network element of claim 7, wherein the commands include a software download command, and the connection controller further distributes the software download command to at least one shelf of the plurality of shelves in an Ethernet signaling format.

13. The multi-shelf network element of claim 7, wherein the commands include an update local tables command, and the connection controller further distributes the update local tables command to at least one shelf of the plurality of shelves in an Ethernet signaling format.

14. The multi-shelf network element of claim 7, wherein the commands include at least one of an initiate connection or a tear-down connection command, and the connection controller further distributes the at least one command to the switch fabric and the plurality of shelves in an Ethernet signaling format.

15. A method for distributing information in a multi-shelf network element in a communication network, the multi-shelf network element having a controller, a plurality of shelves providing communication capabilities for said network element and a plurality of control service links (CSLs), each control service link (CSL) of the plurality of CSLs being connected to a respective shelf of the plurality of shelves, each said CSL having a plurality of connections that provides signaling paths for a plurality of categories of communication signals between the controller and a respective shelf of the plurality of shelves, the method comprising:

transmitting individual categories of said plurality of categories of communication signals over separate connections of said plurality of connections between the controller and each of the plurality of shelves independently of the other connections of said plurality of connections, wherein said plurality of connections are bundled together in a single, collective span of cable comprising a first end having a connector adapted to provide connections for each connection of said plurality of connections to said controller and a second end having a second connector adapted to provide connections for each connection of said plurality of connections to said each shelf, and said first and second connectors have physical profiles which do not allow said first connector to be connected with said shelf and said second connector with said controller.

16. The method of claim 15, wherein
the information includes a synchronizing clock signal, and
said at least one of said plurality of categories of communication signals includes an E1 frame format.

17. The method of claim 15, wherein
the information includes a time-of-day stamp, and
said at least one of said plurality of categories of communication signals includes a RS 485 signaling format.

18. The method of claim 15, wherein
the information includes a severe fault reporting command, and
said at least one of said plurality of categories of communication signals includes an E1 frame format.

19. The method of claim 15, wherein
the information includes at least one of an initiate connection or a tear-down connection command, and
said at least one of said plurality of categories of communication signals includes an Ethernet signaling format.

* * * * *